United States Patent
Kormos et al.

[11] 3,726,504
[45] Apr. 10, 1973

[54] CORROSION RESISTANT VALVING EDGE FOR BUTTER-FLY VALVE DISC

[75] Inventors: Kalman Kormos; Dezso Szilagyi, both of Providence, R.I.

[73] Assignee: General Signal Corporation, Rochester, N.Y.

[22] Filed: Apr. 2, 1971

[21] Appl. No.: 130,707

[52] U.S. Cl. ................................................251/306
[51] Int. Cl. ................................................F16k 1/226
[58] Field of Search..................251/298, 305, 306

[56] References Cited

UNITED STATES PATENTS

| | | | |
|---|---|---|---|
| 3,612,483 | 10/1971 | Pool | 251/306 |
| 2,805,837 | 9/1957 | Kessler | 251/298 X |

FOREIGN PATENTS OR APPLICATIONS

| | | | |
|---|---|---|---|
| 873,117 | 7/1961 | Great Britain | 251/306 |
| 613,700 | 5/1935 | Germany | 251/305 |
| 866,284 | 2/1953 | Germany | 251/306 |

*Primary Examiner*—Henry T. Klinksiek
*Attorney*—George Vande Sande, Harold S. Wynn and Jeffery S. Mednick

[57] ABSTRACT

The disclosure concerns a scheme for providing a corrosion resistant valving edge of the rotatable disc of a butterfly valve. The valving edge is defined by a ring of corrosion resistant material which is shrink fitted into an annular groove formed in the periphery of the disc. The ring is subjected to a substantial hoop stress which compresses it tightly against the surface of the groove and retains it in place. In some cases, however, this self-retaining action may be supplemented by tack welding the ring to the disc.

14 Claims, 6 Drawing Figures

INVENTORS
KALMAN KORMOS
DEZSO SZILAGYI

BY  *Dodge & Ostman*

ATTORNEYS

CORROSION RESISTANT VALVING EDGE FOR BUTTER-FLY VALVE DISC

BACKGROUND AND SUMMARY OF THE INVENTION

A common type of butterfly valve used in water and waste treatment and industrial processes employs an elastomeric (e.g. rubber) seat mounted in the valve body and arranged to coact with a corrosion resistant, rigid valving edge on the rotatable valve disc. In the past, the valving edge was formed in one of three ways, namely, it could be machined as an integral part of a disc made in its entirety from corrosion resistant material, or it could be a preformed ring of corrosion resistant material which is attached to a cast iron disc by a bolted and sealed connection, or it could be machined from a weldment of corrosion resistant material applied to a cast iron disc. However, all of these techniques are quite expensive; the first requiring a large quantity of expensive special alloy, and the other two requiring machining of both the edge-receiving portion of the disc and the edge itself.

The object of this invention is to provide a less expensive corrosion resistant valving edge for a butterfly valve disc. According to the invention, the valving edge is defined by a ring of corrosion resistant material which is seated in a mating continuous groove formed in the periphery of the disc, and which is subjected to a large hoop stress (i.e., tensile stress in the circumferential direction) so that it is tightly compressed against the surface of the groove. The ring is made from wire or straight bar stock of corrosion resistant material, such as stainless steel, which has the desired cross sectional shape. The stock is rolled to form a coil which is then cut to correct size and welded to produce the finished ring. The ring is installed in place in the groove by a shrink fitting process which preferably develops a level of ring-groove contact pressure sufficient to prevent dislodgment of the ring by the hydrostatic or the frictional, seat-engaging forces encountered during service. However, when necessary, this self-retaining action can be supplemented by tack welding the ring to the disc. Since the invention minimizes the amount of corrosion resistant material which is needed, and obviates machining of the edge-defining member, without introducing costly or unreliable manufacturing techniques, it provides a practical and superior solution to the valving edge-forming problem.

BRIEF DESCRIPTION OF THE DRAWINGS

Several embodiments of the invention are described herein with reference to the accompanying drawings in which.

DESCRIPTION OF ILLUSTRATED EMBODIMENTS

Figure 1:
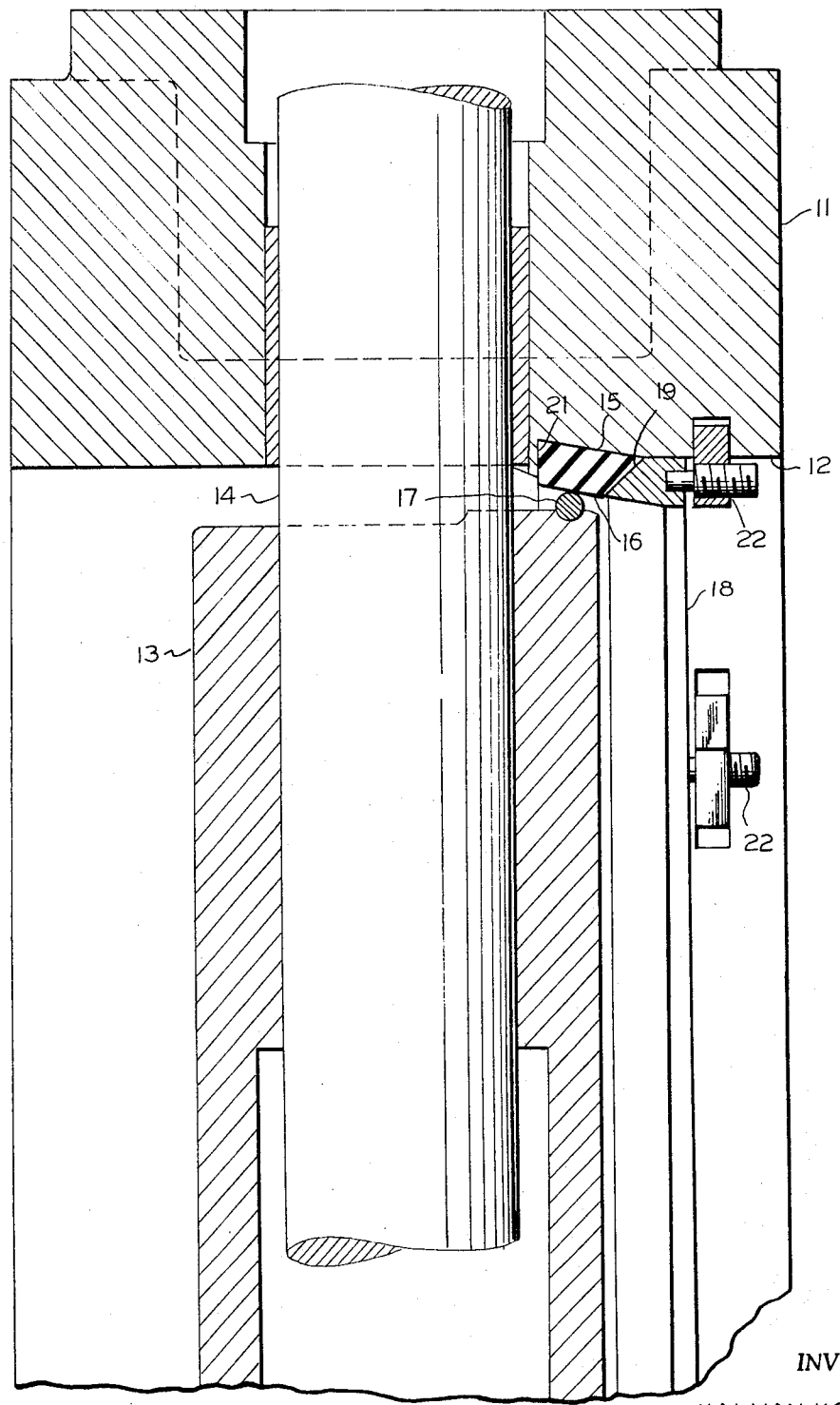
FIG. 1 is a partial axial sectional view of a butterfly valve incorporating one version of the invention.
Figure 2:
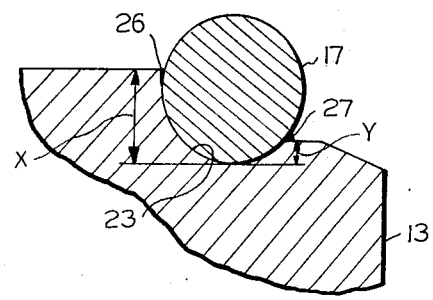
FIG. 2 is an enlarged sectional view of the valving edge shown in FIG. 1.

Referring to FIG. 1, the invention is embodied in a butterfly valve which includes a cast iron, cylindrical body 11 formed with a through flow passage 12, and a circular disc 13 carried by a rotary shaft 14 which is supported by bearings mounted in body 11. The valve body is equipped with a rubber seat ring 15 having a conical or spherical seating surface 16 which is arranged to co-act with the improved valving edge 17 on disc 13. Seat ring 15 is molded to fit a cavity defined by a groove in body 11 and by a sliding, clamping ring 18, and is compressed between ring face 19 and body wall 21 by a circumferential series of uniformly spaced, screw actuators 22. This adjustable seat construction, which is the subject of application Ser. No. 125,047, filed Mar. 17, 1971, is preferred, but conventional seat designs may be used.

The improved valving edge 17 is defined by a stressed ring of circular cross section which is seated in a conforming annular groove 23 machined in the outer periphery of disc 13. The ring is made from a wire or straight bar of corrosion resistant material, such as stainless steel, having a yield strength on the order of 50,000–60,000 p.s.i. The stock has the cross sectional shape desired for the valving edge and is rolled into a coil on a wire forming machine or a spring winder. After the rolled coil is cut to correct size, its ends are welded together and the resulting flash is removed. The fabricated ring has an inside diameter which is slightly smaller (e.g. 0.001 inch per inch of diameter smaller) than the minimum diameter of groove 23, and it is shrink fitted onto disc 13. This procedure involves heating the ring to a temperature sufficient to expand it the amount required for installation, but not so high as to adversely affect the physical properties of the ring material. For stainless steel, a temperature of about 650°F to 700°F has proven satisfactory. The interference fit between ring 17 and groove 23 subjects the ring to a hoop stress and causes it to be compressed tightly against the surface of the groove. The level of the hoop stress should be high, but safely below the yield strength of the ring material, and preferably is selected to produce a ring-groove contact pressure of at least four times the pressure rating of the valve for which the disc is intended. Experience indicates that this minimum contact pressure gives reliable insurance that ring 17 will not be dislodged from groove 23 during service by either hydrostatic forces or the frictional force which is developed as the edge rubs across seat 15.

Figure 3:
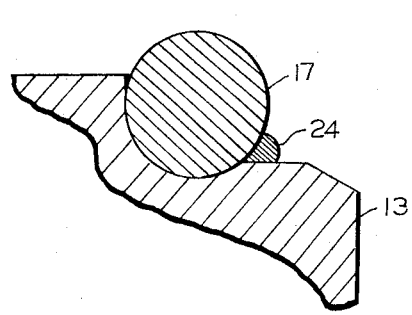
FIGS. 3 and 4 are sectional views similar to FIG. 2 showing two alternative embodiments of the invention.
Figure 4:
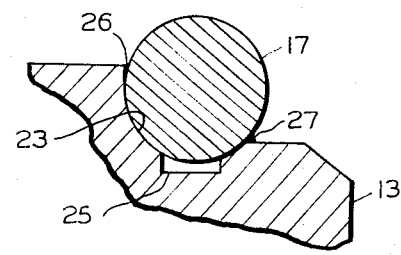

In cases where hoop stress is limited to a level which precludes creation of the desired minimum ring-groove contact pressure in the FIG. 1 embodiment, several alternatives should be considered before reducing the margin of safety incorporated in that minimum value. One obvious possibility is to make ring 17 from a material having a higher yield strength in order to raise the allowable hoop stress. Another alternative is to supplement the inherent holding ability of the shrink fit by tack welding ring 17 to disc 13, as shown at 24 in FIG. 3. The welds are spaced uniformly around the circumference of the disc, and the number employed is selected in accordance with the diameter of the wire used in ring 17 so that bending of the ring portions between welds is precluded. Another, and less troublesome, alternative is to cut away a medial portion of groove 23 (see annular recess 25 in FIG. 4). This measure reduces the contact area between the ring and groove, and consequently increases contact pressure for a given level of hoop stress. Obviously, each of these approaches may be used by itself or in combination with one or both of the others.

Although ring 17 is tightly compressed against groove 23, irregularities in the mating metal surfaces preclude formation of a fluid-tight joint. Therefore, in tight closing valves, i.e., those which must pass the air bubble test of the American Water Works Association, a sealant compound is applied to the margins 26, 27 of the ring-groove interface. A suitable compound is the AVV grade of LOCKTITE sealant marketed by the Locktite Corporation of Newington, Connecticut. As an added precaution, it is considered desirable to extend the shoulder X at the shaft side of groove 23 radially outward about one-sixteenth inch beyond the center of ring 17 in order to create a wedge-shaped recess at margin 26. This measure facilitates penetration of the sealant into the ring-groove interface.

The radial height of shoulder X at the shaft side of groove 23 is not limited, except by the requirement that seat 15 be engaged by ring 17, and not by any portion of disc 13. However, the height of the shoulder Y at the opposite side of the groove must take into account the manner in which ring 17 is installed. In other words, the height of shoulder Y is determined by the diameter of disc 13, the coefficient of thermal expansion of the material in ring 17, the required hoop stress in the ring (i.e., the degree of interference between the ring and the groove surface), and the maximum temperature to which ring 17 may be heated during the shrink fitting process. The limitation on shoulder height imposed by these factors may present a problem in the case of small valves because it is considered wise, in light of normal manufacturing tolerances, to always require a minimum shoulder height of 0.015''. If this requirement cannot be met, or can be satisfied only at the expense of reducing ring-groove contact pressure below its desired minimum, it is recommended that one or both of the remedial measures depicted in FIGS. 3 and 4 be employed.

For maximum ring-holding capability, the height of groove shoulder Y must be increased as the diameter of disc 13 increases. However, we have found that valves of the type used in the water and waste treatment fields (i.e., those having diameters on the order of 6 to 72 inches, and rated at pressures between 25 p.s.i. and 150 p.s.i.) do not require close matching of shoulder height to disc diameter. Specifically, our experience indicates that each size of disc in this product line may use a shoulder Y of the same height as the corresponding shoulder of the next smaller disc, provided that the rings 17 of both discs are made of the same diameter wire. This discovery is important in in cases where grooves 23 are milled because it permits use of the same cutter for consecutive valve sizes, and thus reduces tooling costs.

Figure 5:
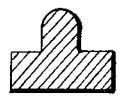
FIGS. 5 and 6 are cross sectional views of alternative rings suitable for use in large valves.
Figure 6:

Aside from the fact that the outside diameter of ring 17, i.e., the portion which engages seat 15, must be rounded, the cross sectional shape of the ring is not critical. At the present time, a circular shape is generally considered best because it provides the closest tolerances for the price. However, in the case of very large valves, other shapes should be considered because a circular wire having a relatively small diameter, which is advantageous from the disc-seat sealing standpoint, probably cannot handle the high hoop stress needed to produce the desired ring-groove contact pressure. Two alternative cross sections for the rings in these valves are shown in FIGS. 5 and 6. In each of these embodiments, the ring affords both a large cross sectional area, and consequently a high allowable hoop stress, and an outside diameter which is rounded on a small radius.

We claim:

1. A rotatable disc for a butterfly valve characterized by a rigid corrosion resistant valving edge defined by a ring of rigid corrosion resistant material which is seated in a continuous annular groove formed in the periphery of the disc, the ring being under a substantial hoop stress and being compressed tightly against the surface of the groove, and the groove being dimensioned and located to permit installation of the ring by shrink fitting technique.

2. The butterfly valve disc defined in claim 1 in which the ring has a rounded outer peripheral portion and an inner peripheral portion which is shaped to conform to the groove.

3. The butterfly valve disc defined in claim 2 in which the ring has a circular cross section.

4. The butterfly valve disc defined in claim 1 in which the contact pressure between the ring and the surface of the groove is at least four times the pressure rating of the valve in which the disc is used.

5. The butterfly valve disc defined in claim 1 in which
   a. the surface of the groove has a medial portion of minimum diameter and end portions having greater, but unequal, diameters, the end portion of larger diameter being closer to the rotational axis of the disc than the other end portion; and
   b. the ring, in the unstressed state, has a smaller inside diameter than the diameter of the medial portion of the groove.

6. The butterfly valve disc defined in claim 1 in which the ring is tack welded to the disc at spaced points around its circumference.

7. The butterfly valve disc defined in claim 1 in which the surface of the groove has a depressed medial portion which is spaced radially inward from the inner peripheral surface of the ring.

8. In a butterfly valve including a body formed with a through flow passage which is encircled by an elastomeric seat and contains a rotatable disc, the improvement comprising a rigid valving edge on the disc which coacts with the seat to control flow through said passage and is defined by a ring of rigid, corrosion resistant material which is seated in a continuous annular groove formed in the periphery of the disc, the ring being under a substantial hoop stress and being compressed tightly against the surface of the groove, and the groove being dimensioned and located to permit installation of the ring by shrink fit technique.

9. An improved butterfly valve as defined in claim 8 in which said ring has a rounded outer peripheral portion which engages said elastomeric seat, and an inner peripheral portion which is shaped to conform to said groove.

10. An improved butterfly valve as defined in claim 9 in which said ring has a circular cross section.

11. An improved butterfly valve as defined in claim 8 in which the contact pressure between said ring and the surface of the groove is at least four times the pressure rating of the valve.

12. An improved butterfly valve as defined in claim 8 in which
   a. the surface of the groove has a medial portion of minimum diameter and end portions having greater, but unequal, diameters, the end portion of larger diameter being closer to the rotational axis of the disc than the other end portion; and
   b. the ring, in the unstressed state, has a smaller inside diameter than the diameter of the medial portion of the groove.

13. An improved butterfly valve as defined in claim 8 in which said ring is tack welded to the disc at spaced points around its circumference.

14. An improved butterfly valve as defined in claim 8 in which the surface of the groove has a depressed medial portion which is spaced radially inward from the inner peripheral surface of the ring.

* * * * *